(No Model.)
W. R. FOWLER.
MILK COOLER.
No. 345,776.   Patented July 20, 1886.
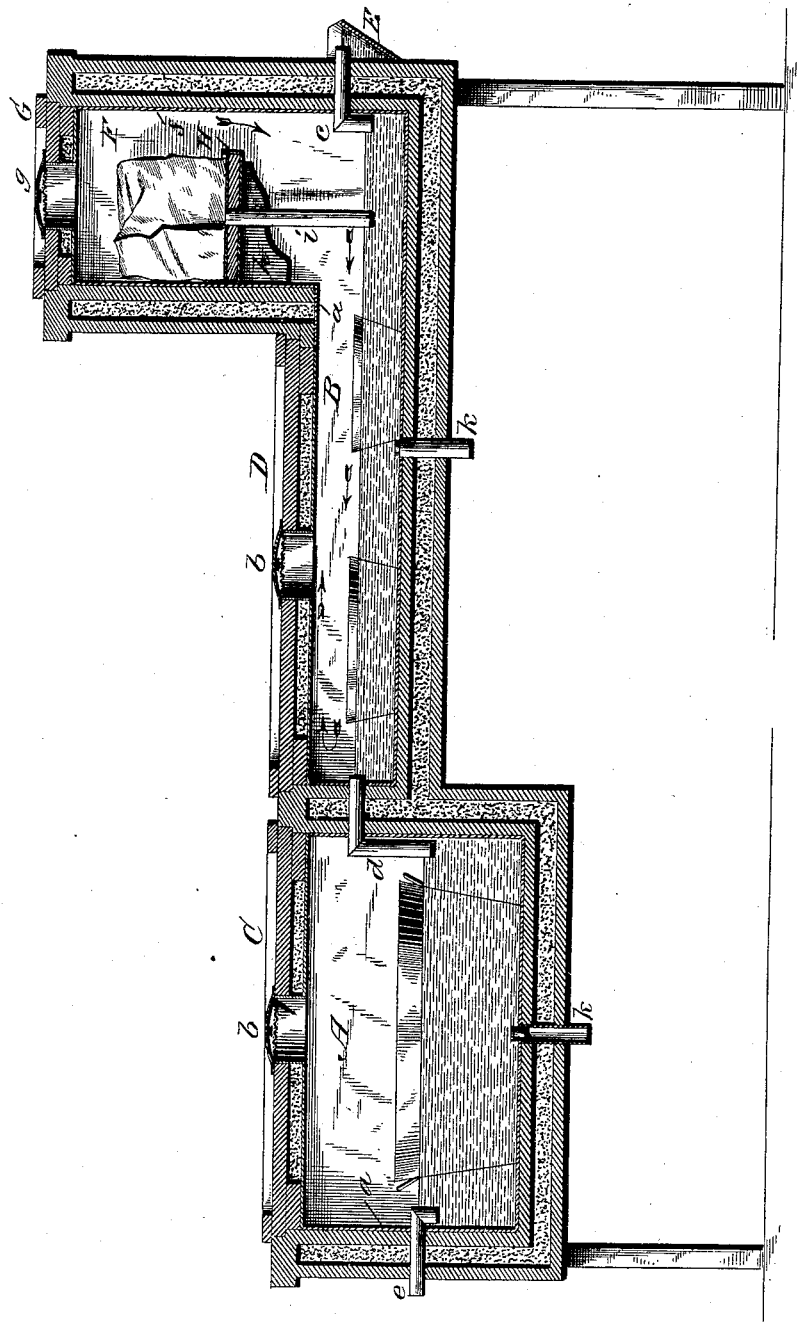
Witnesses:
Chas. J. Williamson
L. L. Miller
Inventor:
William R. Fowler
per Chas. H. Fowler
Attorney

UNITED STATES PATENT OFFICE.

WILLIAM R. FOWLER, OF LAFAYETTE, INDIANA.

MILK-COOLER.

SPECIFICATION forming part of Letters Patent No. 345,776, dated July 20, 1886.

Application filed March 4, 1886. Serial No. 194,008. (No model.)

*To all whom it may concern:*

Be it known that I, WILLIAM R. FOWLER, a citizen of the United States, residing at Lafayette, in the county of Tippecanoe and State of Indiana, have invented certain new and useful Improvements in Milk-Coolers; and I do hereby declare that the following is a full, clear, and exact description of the same, reference being had to the annexed drawing, making a part of this specification, and to the letters and figures of reference marked thereon.

The present invention has reference to that class of milk-coolers provided with a deep and a shallow water-tank communicating with each other through pipes constructed to form traps to exclude the air, and is designed as an improvement on my former patent of January 26, 1886, No. 334,767; and it consists in providing the shallow tank with an ice-chamber, a removable shelf for supporting the ice, and a drip-tube connected thereto, and of sufficient length to extend down below the water-level in said tank, substantially as shown in the drawing, and hereinafter described and claimed.

In the accompanying drawing, which is a longitudinal section of the cooler, A B represent, respectively, the deep and shallow tanks, which are preferably lined with sheet metal, as shown at $a$, and are each provided with a cover, C D, having suitable ventilators, $b$, for carrying off the impurities arising from the milk contained in the pans which are placed in the water. The tanks above described are formed with double walls having a filling of charcoal or other suitable non-conductor of heat, as are also the covers to said tanks. The tank B at its outer end is provided with a pipe, $c$, for supplying water thereto, and a bucket, E, is connected to the end of the tank which surrounds the projecting end of the pipe, and extends above it, the bucket receiving the water from the pump or spring, and thus avoids the necessity of making a connection to the pipe when filling the tanks. The tanks A B communicate with each other through a pipe, $d$, and the water is discharged through a pipe, $e$, at the end of tank A, the several pipes above described having downwardly-extending elbows, which come below the water-level to form traps for the exclusion of air, which would otherwise pass from one tank to the other.

The above-described construction is the same as in my former patent, and the improvement thereto consists in the ice-chamber F, which, like the tanks A B, is formed with double walls containing a heat-non-conducting filling, and has a sheet-metal lining, $f$, a cover, G, with ventilator $g$. The ice-chamber F extends some distance above the tank B, and forms an extension thereto, and has connected to one of its side walls brackets $h$, for supporting thereon a shelf, H, upon which the ice is placed, said shelf being formed hollow, with a filling of charcoal or other heat-non-conducting material, or, if preferred, simply a sheet-metal pan or shelf may be used without constructing it hollow. This pan or shelf rests upon the brackets and is not attached thereto, thus enabling it to be removed for cleaning or other purposes, and has connected to it a drip-tube, $i$, which is of sufficient length to extend down below the water-level in the tank B, as shown, to prevent any drippings from the ice entering the milk, should the pans be placed near it, and also to prevent the air passing up the tube.

The purpose of the ice-chamber is to cool the water in the shallow tank as it passes therefrom to the deep tank when the water from the pump or spring is not sufficiently cold to reduce the milk to the required temperature. The cold air produced by the ice does not pass from the shallow to the deeper tank, but remains in the former-mentioned tank for the express purpose of reducing the temperature much lower. This is considered necessary, for the reason that after the cream is taken off the milk, and it is desired to keep the cream a few days, the temperature of the cream must be much lower than that of milk.

The course or circulation of the cold air in the tank B and ice-chamber F is indicated by the arrows; and to drain the tanks of water for the purpose of cleaning, the tanks are provided with suitable pipes, $k$, having plugs or faucets at their lower ends, as found desirable.

Having now fully described my invention, what I claim as new, and desire to secure by Letters Patent, is—

In a milk-cooler, one deep and one shallow tank communicating with each other through a pipe, and provided, respectively, at their outer ends with a discharge-pipe and a supply-pipe, the several pipes having elbows to act as traps, in combination with an ice-chamber forming an extension to the shallow tank and arranged above it, and provided with a shelf or pan for the ice, and a drip-tube connected thereto and extending down below the water-level in said tank, substantially as and for the purpose set forth.

In testimony that I claim the above I have hereunto subscribed my name in the presence of two witnesses.

WILLIAM R. FOWLER.

Witnesses:
J. L. CROFT,
JOHN W. BEASLEY.